(12) United States Patent
Hind et al.

(10) Patent No.: US 7,996,757 B2
(45) Date of Patent: *Aug. 9, 2011

(54) LOW-LATENCY, INCREMENTAL RENDERING IN A CONTENT FRAMEWORK

(75) Inventors: John R. Hind, Raleigh, NC (US); Thomas Schaeck, Achern (DE); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 888 days.

This patent is subject to a terminal disclaimer.

(21) Appl. No.: 11/948,457

(22) Filed: Nov. 30, 2007

(65) Prior Publication Data

US 2008/0134014 A1 Jun. 5, 2008

Related U.S. Application Data

(63) Continuation of application No. 09/954,951, filed on Sep. 18, 2001, now Pat. No. 7,346,843.

(51) Int. Cl.
*G06F 17/00* (2006.01)
*G06F 17/30* (2006.01)
(52) U.S. Cl. ........................ 715/205; 707/802
(58) Field of Classification Search .................. 715/205; 707/802

See application file for complete search history.

(56) References Cited

U.S. PATENT DOCUMENTS

| | | |
|---|---|---|
| 6,278,993 B1 | 8/2001 | Kumar et al. |
| 6,396,500 B1 | 5/2002 | Qureshi et al. |
| 6,438,575 B1 | 8/2002 | Khan et al. |
| 6,442,529 B1 | 8/2002 | Krishan et al. |
| 6,453,361 B1 * | 9/2002 | Morris .................. 709/250 |
| 6,460,084 B1 | 10/2002 | Van Horne et al. |
| 6,610,105 B1 | 8/2003 | Martin et al. |
| 6,643,661 B2 | 11/2003 | Polizzi et al. |
| 6,668,353 B1 | 12/2003 | Yurkovic |
| 6,691,106 B1 | 2/2004 | Sathyanarayan |
| 6,725,425 B1 | 4/2004 | Rajan et al. |
| 6,799,174 B2 | 9/2004 | Chipman et al. |
| 6,802,042 B2 | 10/2004 | Rangan et al. |
| 6,832,263 B2 * | 12/2004 | Polizzi et al. ............ 709/246 |
| 6,871,197 B1 | 3/2005 | Johnson |
| 6,892,206 B2 | 5/2005 | Dharap |
| 6,912,532 B2 | 6/2005 | Andersen |
| 6,912,691 B1 | 6/2005 | Dodrill et al. |
| 6,920,488 B1 | 7/2005 | Le Pennec et al. |
| 6,920,615 B1 | 7/2005 | Campbell et al. |

(Continued)

OTHER PUBLICATIONS

Herzog, Marcus, et al., "InfoPipes: A Flexible Framework for M-Commerce Applications", TES 2001, LNCS 2193, Rome, Italy, Sep. 14-15, 2001, pp. 175-186.*

(Continued)

*Primary Examiner* — Robert Stevens
(74) *Attorney, Agent, or Firm* — Bruce Clay

(57) ABSTRACT

Techniques are disclosed for incrementally rendering content in a content framework (such as a portal page provided by a portal system). Upon receiving a request for a portal page, a portal server immediately returns a response including the results from portlets which have acquired their content. If some portlets have not yet finished, subsequent content is delivered at a later time through use of one of several alternative programmatically-generated mechanisms. Capabilities of existing browsers are leveraged for several embodiments, including use of refresh headers, multipart MIME ("Multi-purpose Internet Mail Extensions") types, and portal pages structured using frames.

17 Claims, 8 Drawing Sheets

U.S. PATENT DOCUMENTS

| | | | |
|---|---|---|---|
| 6,957,390 B2 | 10/2005 | Tamir et al. | |
| 7,073,129 B1 | 7/2006 | Robarts et al. | |
| 7,111,243 B1 | 9/2006 | Ballard et al. | |
| 7,155,678 B2 | 12/2006 | Cooper et al. | |
| 7,165,088 B2 | 1/2007 | Cohen et al. | |
| 7,269,664 B2* | 9/2007 | Hutsch et al. | 709/246 |
| 7,281,060 B2* | 10/2007 | Hofmann et al. | 709/246 |
| 2001/0009016 A1* | 7/2001 | Hofmann et al. | 709/219 |
| 2001/0025300 A1* | 9/2001 | Miller et al. | 709/206 |
| 2001/0034771 A1* | 10/2001 | Hutsch et al. | 709/217 |
| 2001/0051907 A1* | 12/2001 | Kumar et al. | 705/36 |
| 2002/0007312 A1 | 1/2002 | Yokogawa | |
| 2002/0010739 A1 | 1/2002 | Ferris et al. | |
| 2002/0019810 A1* | 2/2002 | Kumar et al. | 705/42 |
| 2002/0023122 A1 | 2/2002 | Polizzi et al. | |
| 2002/0023158 A1 | 2/2002 | Polizzi et al. | |
| 2002/0024536 A1 | 2/2002 | Kahan et al. | |
| 2002/0026500 A1* | 2/2002 | Kanefsky et al. | 709/219 |
| 2002/0029245 A1 | 3/2002 | Nahon et al. | |
| 2002/0029296 A1 | 3/2002 | Anuff et al. | |
| 2002/0042830 A1 | 4/2002 | Bose et al. | |
| 2002/0049655 A1* | 4/2002 | Bennett et al. | 705/35 |
| 2002/0049713 A1 | 4/2002 | Khemlani et al. | |
| 2002/0049727 A1* | 4/2002 | Rothkopf | 707/1 |
| 2002/0083067 A1* | 6/2002 | Tamayo et al. | 707/100 |
| 2002/0083157 A1 | 6/2002 | Sekiguchi et al. | |
| 2002/0091753 A1 | 7/2002 | Reddy et al. | |
| 2002/0111922 A1* | 8/2002 | Young et al. | 705/80 |
| 2002/0123957 A1 | 9/2002 | Notarius et al. | |
| 2002/0133566 A1 | 9/2002 | Teeple | |
| 2002/0147777 A1 | 10/2002 | Hackbarth et al. | |
| 2002/0152114 A1 | 10/2002 | Shumaker et al. | |
| 2002/0161876 A1 | 10/2002 | Raymond | |
| 2002/0170060 A1 | 11/2002 | Lyman | |
| 2002/0194267 A1 | 12/2002 | Flesner et al. | |
| 2002/0198963 A1 | 12/2002 | Wu et al. | |
| 2004/0030781 A1 | 2/2004 | Etesse et al. | |

OTHER PUBLICATIONS

Li, Wen-Syan, et al., "CachePortal: technology for Accelerating Database-driven E-commerce Web Sites", Proc. of the 27th International Conf. on Very Large Databases, Rome, Italy, Sep. 11-14, 2001, pp. 699-700.*

Wills, Craig E., et al., "Studying the Impact of More Complete Server Information on Web Caching", Computer Communications, vol. 24, Issue 2, Feb. 2001, pp. 184-190.*

Richmond, Alan, "HTML's META-tag: HTTP-EQUIV", Oct. 12, 1999, 4 pages (including URL date page from Wayback Machine).*

Lemay, Laura, et al., SAMS teach Yourself Web Publishing with HTML 4 in 21 Days, Sam's Publishing, Indianapolis, IN, © 2000, pp. 360-381.*

Li et al. "Distributed Application Service for Internet Information Portal", *ISCAS 2000*, Geneva, Switzerland, pp. 289-292 (2000).

Wills et al. "Studying the Impact of More Complete Server Information on Web Caching", *Computer Communications*, 24(2):184-190 (2001).

Franklin et al. "A Framework for Scalable Dissemination-Based Systems", *OOPSLA* pp. 94-105 (plus citation page) (1997).

Berghel, Hal "Mixed Media: The New Push for Push Technology", *netWorker* 2(3):28-36 (plus citation page) (1998).

"Oracle Quick Portal Tour", pp. 1-6 (2000) (downloaded from: http://12.46.245.173/help/qt_frm.htm).

Naudé, Frank "Oracle Portal (WebDB) FAQ", pp. 1-3 (2001) (downloaded from: www.orafaq.com/faqwebdb.htm).

"Plumtree Software and Actuate Announce Availability of New Portal Gadgets", *Actuate Press Release* pp. 1-3 (2001) (downloaded from: www.actuate.com/company/news/press-releases-resources.asp?ArticleID=617).

Singer, Michael "Plumtree Opens Online Gadget Workshop and Showroom", internetnews.com 1 page (2001) (downloaded from: www.internetnews.com/xSP/article.php/582561).

Sollicito, Michelle Johnston "E-Portal Software Options: A Comparison of Current Products", informit.com pp. 1-6 (2002) (downloaded from: www.informit.com/articles/printerfriendly.asp?p=30027&rl=1).

Hochstetler et al. "Introducing Tivoli Personalized Services manager 1.1", *IBM Redbooks* pp. cover, i-xv, and 181-262 (2001).

Butler, et al. "OmniSearch: A method for searching dynamic content on the Web", *ACM SIGMOD* p. 604 (2001).

Chen et al. "WebMate: A Personal Agent for Browsing and Searching", *Autonomous Agents* pp. 132-139 (1998).

Yew et al. "Customisable Off-Line Web Browsing with Mobile Software Agents", *IEEE* pp. 102-108 (2000).

Musciano, et al. "HTML & XHTML: The Definitive Guide, $4^{th}$ Edition", *O'Reilly Publishing* pp. 1-7 (2000) (downloaded from: skaiste.elekta.It/Books/O'Reilly/Bookshelfs/books/webdesign/xhtml/index.htm).

Niederst, Jennifer "Web Design in a Nutshell, $2^{nd}$ Edition", *O'Reilly Publishing* pp. 1-7 (2001) (downloaded from: skaiste.elekta.It/Books/O'Reilly/Bookshelfs/books/webdesign/wdesign/index.htm).

Richmond, Alan "HTML's META-tag: HTTP-EQUIV", pp. 1-3 (1999) (plus URL date page from Wayback Machine), downloaded from: www.wdvl.com/Authoring/HTML/Head/Meta/HTTP.html.

Kyrnin, Jennifer "HTML/XML" pp. 1-3 (2000) (plus Wayback Machine date page), downloaded from: html.about.com/library/weekly/aa080300a.htm.

Finkelstein, et al. "XML and Corporate Portals" pp. 1-13 (1999) downloaded from: www.wilshireconferences.com/xml/paper/XML-Portals.htm.

Teo, Billy "Hello, kitschy!", *Computer Times* pp. 1-2 (2000) downloaded from: www.volum.net/news006.htm.

"Techniques for creating inter-page slide shows" *JavaScript Kit* pp. 1-3 (1998) downloaded from: www.javascriptkit.com/howto/interslide.shtml.

"Introduction to I-Mode" pp. 1-6 (2004) (provides background information on NTT DoCoMo service) downloaded from: archive.devx.com/wirelss/articles/I-Mode/I-ModeIntro.asp.

LeMay, Laura "SAMS Teach Yourself Web Publishing with HTML 4 in 21 Days, $2^{nd}$ Edition", *Sam's Publishing* pp. 360-381 (2000).

"An Exploration of Dynamic Documents", 8 pages, http://home.netscape.com/assist/net_sites/pushpull.html, 2010.

"HTML's META-tag: HTTP-EQUIV", 3 pages, http://www.wdvl.com/Authoring/HTML/Head/Meta/HTTP.html, 2010.

Request for Comments 2518 from the Internet Engineering Task Force, entitled "HTTP Extensions for Distributed Authoring—WEBDAV," (Feb. 1999), 88 pages.

* cited by examiner

FIG. 2A

| | |
|---|---|
| 205 | HTTP/1.1 200 OK |
| 210 | Content-Type: text/html |
| 215 | Refresh: 12 |
| | ... content follows ... |

FIG. 2B

220     \<META HTTP-EQUIV="Refresh" CONTENT="12" /\>

FIG. 2C

250
```
                    230                            240
Content-type: multipart/x-mixed-replace;boundary=PortalPageContent --PortalPageContent
Content-type:  text/html ... initial version of HTML page content ...
```

260
```
--PortalPageContent
Content-type:  text/html

... second version of HTML page content ...
```

270
```
--PortalPageContent
Content-type:  text/html

... third version of HTML page content ...

--PortalPageContent--
```

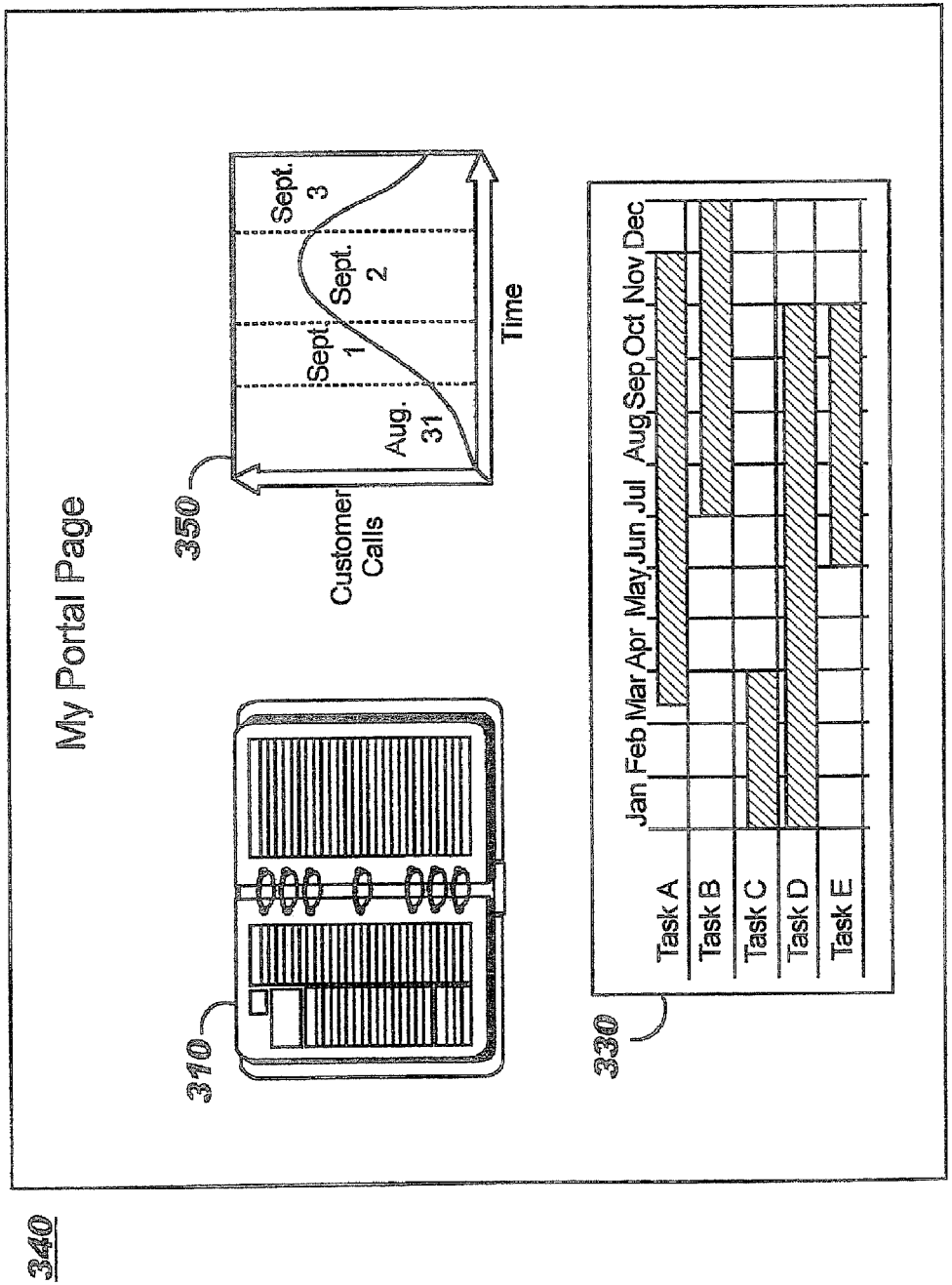

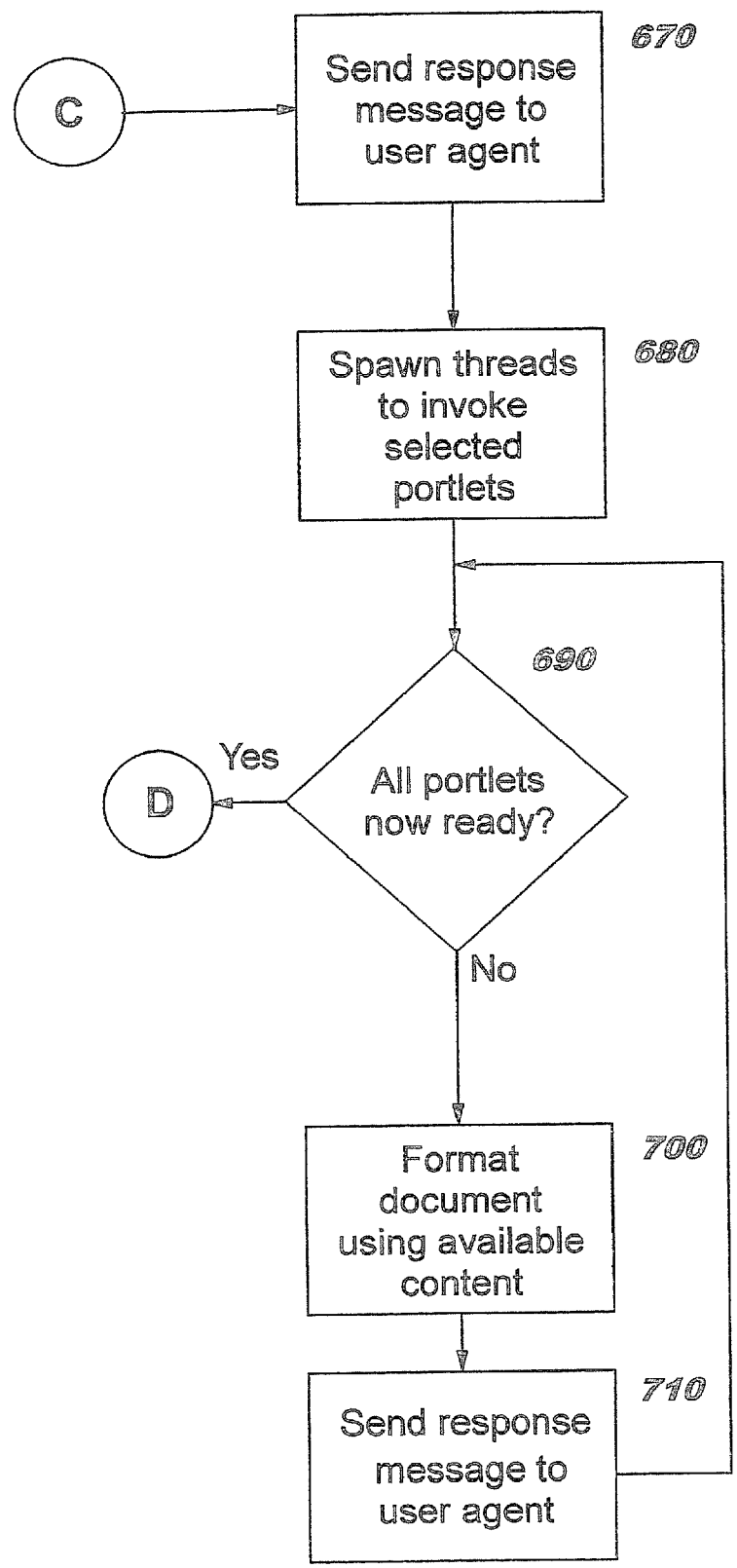

LOW-LATENCY, INCREMENTAL RENDERING IN A CONTENT FRAMEWORK

CROSS-REFERENCE TO RELATED APPLICATIONS

This application is a continuation application of U.S. patent application Ser. No. 09/954,951, filed Sep. 18, 2001 now U.S. Pat. No. 7,346,843, the disclosure of which is hereby incorporated by reference herein in its entirety.

BACKGROUND OF THE INVENTION

1. Field of the Invention

The present invention relates to computer software, and deals more particularly with improved techniques for rendering content in a content framework (such as a portal page provided by a portal system).

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

The early Internet served primarily as a distributed file system in which users could request delivery of already-generated static documents. In recent years, the trend has been to add more and more dynamic and personalized aspects into the content that is served to requesters. One area where this trend is evident is in the increasing popularity of content frameworks such as those commonly referred to as "portals" (or, equivalently, portal systems or portal servers). A portal is a type of content framework that serves as a gateway, or focal point, for users to access an aggregation or collection of content from multiple sources. A portal provides its users with a Web page known as a "portal page", often structured as a single overview-style page (which may provide links for the user to navigate to more detailed information). Alternatively, portal pages may be designed using a notebook paradigm whereby multiple pages are available to the user upon selecting a tab for that page. Some experts predict that portal pages will become the computing "desktop" view of the future.

Portal pages offer users Web pages that contain content from many different sources, and provide rich content to users in a compact form. Sources of portal page content include Internet sites, a company's intranet, news groups, applications, and other content management feeds. Many portals allow users to design a personalized version of the portal page, whereby the user can tailor the content, the layout, and/or the presentation attributes (such as color, font, etc.) of the page to his or her own preferences.

Portals are commonly designed using a component model that allows plugging components referred to as "portlets" (or, alternatively, components using a similar abstraction) into the portal infrastructure. Each portlet is responsible for obtaining a portion of the content that is to be rendered as part of the complete portal page for the user. The end result of the portal's content aggregation process is a Web page whose content is well suited for the needs of the portal user. FIG. 1 provides an example of a portal page 100 which includes three portlets 110, 120, 130. Portlet 110 in this example displays news headlines. Portlet 120 shows a stock ticker for the user's favorite stocks, and portlet 130 displays the current weather and weather forecast for the user's selected city.

While portal pages, by their nature, are rich in content, they are not without their disadvantages. Obtaining the content for the rendering can be a time-consuming process. In order to create a page of aggregated content, the portal must execute each portlet, wait for it to obtain and tailor its content, and then splice this content together into a markup language document representing the portal page it intends to send (as a stream) to the requesting browser. As a result of this process, the portal page renderer of the portal is unable to send content to the browser until the content generated by each of the portlets has been obtained. Thus, if one portlet takes an unusually long amount of time to acquire its content (for example, due to Internet delays, a server being down, and so forth), the portal user experiences having to wait a long time to see any content at all from his or her portal page. The user may think the portal is broken, or may simply become frustrated with using the portal. Many portal sites command a great deal of advertising revenue, due to their popularity with large numbers of users. Enterprises providing portals must therefore strive to keep their users happy, including avoiding these types of delays.

One prior art approach to reducing the time a user waits for receiving a portal page is to spawn individual threads for each portlet. This introduces concurrency into the computing time on the portal, and helps to reduce latency to a certain extent. However, it is still the case that the portal page cannot be delivered to the browser for rendering to the user until all the portlets have acquired their content.

SUMMARY OF THE INVENTION

An object of the present invention is to provide improved techniques for rendering content in a content framework (such as a portal page provided by a portal system).

Another object of the present invention is to provide techniques for incrementally rendering portal pages to users.

A further object of the present invention is to provide end users with an improved experience when using portal pages.

Yet another object of the present invention is to enable delivering partially-complete portal pages to users, thereby reducing the user's wait time, and programmatically generating a mechanism for retrieving the remaining content.

It is another object of the present invention to provide improved portal page rendering with minimal disruption to existing end-user systems.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for incrementally rendering content in a content framework. In one aspect, this technique comprises: receiving a request for a portal page, wherein one or more portlets provide content for the portal page; immediately returning a response message containing a first document, the first document representing results from portlets which have acquired their content; and programmatically generating a mechanism for delivering an updated document if the first document does not represent results of all portlets.

In another aspect, this technique comprises: receiving a request for a portal page, wherein one or more portlets provide content for the portal page; immediately returning a response message containing a first document, the first document representing results from portlets which have acquired their content; and automatically delivering an updated document if the first document does not represent results of all portlets.

In a further aspect, this technique comprises: receiving a request for a portal page frame, wherein one or more portlets provide content for the portal page frame; immediately returning a response message containing a first mini-document, the first document representing results from portlets which have acquired their content; and programmatically generating a mechanism for delivering an updated mini-document if the first mini-document does not represent results of all portlets.

The present invention may also be used advantageously in methods of doing business, for example by providing improved portal systems and/or services wherein the delivery of content from such systems/services occurs in an improved manner. Providers of such systems and services may offer their content-provider clients some assurances of improved initial content delivery time, such that the content providers can expect improved end-user viewing experiences.

The present invention will now be described with reference to the following drawings, in which like reference numbers denote the same element throughout.

BRIEF DESCRIPTION OF THE DRAWINGS

FIGS. 2A-2C depict several representative examples of syntax that may be used to enable incremental rendering of portal pages, according to preferred embodiments of the present invention;

FIG. 3B shows the sample portal page from FIG. 3A after a second incremental delivery of portlet content has occurred, according to the present invention.

DETAILED DESCRIPTION OF EMBODIMENTS

Figure 1:
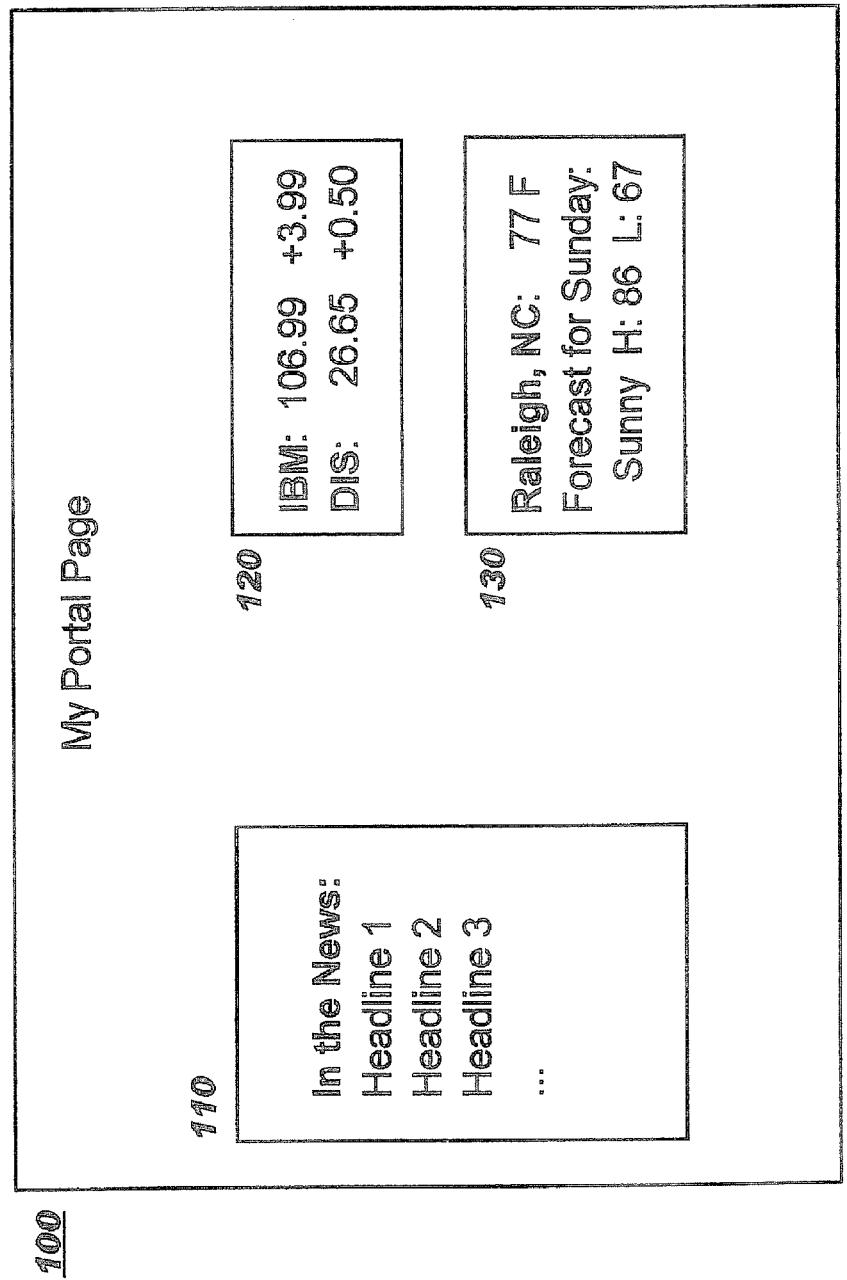
FIG. 1 illustrates a portal page which aggregates content from three portlets, according to the prior art.

The present invention provides improved techniques for rendering content in a content framework. For purposes of illustration but not of limitation, the content framework is described herein as a portal, and the components that plug into this framework are described as portlets. Several alternative techniques are disclosed for incrementally delivering portlet output to a user's browser (or other user agent, equivalently), thereby reducing the time the user spends waiting for his or her portal page to be rendered. Preferred embodiments take advantage of existing browser capabilities, thereby enabling the advantages of the present invention to be realized without requiring modifications to end-user software or end-user devices. (In cases where an end user's browser does not support one or more of these capabilities, the advantages of the present invention may be realized after upgrading the browser or by modifying the browser to support the capabilities. Because the capabilities leveraged by the present invention are well known in the art, revisions to browser code to support the capabilities should be straightforward.)

The techniques of the present invention are directed toward providing an end user with a portal page immediately, where this initially-provided portal page contains content from those portlets for which content was available upon receiving the portal page request. This initial portal page is then updated to include the delayed portlet content at a later time. The update mechanism is programmatically generated by the portal, using one of several techniques, as will now be described.

In a first embodiment, a refresh header is used to inform the browser receiving a partially-complete portal page that a revised, or refreshed, version of the page should be requested after waiting for a specified length of time. Refresh headers are well known in the art, and are commonly supported by browsers as an extension of the Hypertext Transfer Protocol ("HTTP"). Use of refresh headers is sometimes referred to as a "client pull" technique, because the client (i.e. the browser) is responsible for requesting the revised content. In a second embodiment, multipart MIME ("Multi-purpose Internet Mail Extensions") messages are used to enable the portal to deliver revised content directly to the browser on the portal's initiative (e.g. as each portlet completes, or after all portlets complete, or perhaps after expiration of some time interval). In particular, the MIME type "multipart/x-mixed-replace" (or an analogous content type) is preferably used for this second embodiment. Use of this MIME type is sometimes referred to as a "server push" technique, because the server (i.e. the portal) pushes content to the browser under the server's control. Client pull and server push for delivering revised Web page content to a browser are described in "An Exploration of Dynamic Documents", published by Netscape Communications Corp. on the Internet at http://home.netscape.com/assist/net_sites/pushpull.html. The present invention defines novel approaches for adapting these techniques to use with portlets and portal pages.

FIGS. 2A and 2B provide examples of syntax that may be used for incremental portal page rendering according to the first embodiment of the present invention. FIG. 2A illustrates an HTTP response message sent to a browser when transmitting an initial partially-complete portal page. In this example, the response header shown in FIG. 2A indicates the following information: (1) the status is "OK" (see element 205); (2) the content type of this response message is "text/html" (see element 210); and (3) the content delivered with this response message should be refreshed, for this example, after waiting 12 seconds (see element 215). An alternative syntax is shown in FIG. 2B, which uses a Hypertext Markup Language ("HTML") META tag with an HTTP-EQUIV attribute, as shown at 220. In general, a META tag may be used to identify properties of a document, and an HTTP-EQUIV attribute on a META tag may be used in markup language documents to explicitly specify information that an HTTP server should convey in the HTTP response message with which the document is transmitted. In the example of FIG. 2B, the value of the HTTP-EQUIV attribute is "Refresh", and the value of the CONTENT attribute is "12". Thus, this example syntax specifies that the content of the HTML document which includes the META tag should be refreshed after waiting for 12 seconds, and has an effect equivalent to the refresh header of FIG. 2A for browsers which support META tags in HTML documents. (META tags are supported by browsers implementing HTML 3.0 and above.) Information on the META tag and HTTP-EQUIV attribute can be found in Request For Comments ("RFC") 2518 from the Internet Engineering Task Force, which is entitled "HTTP Extensions for Distributed Authoring—WEBDAV" (February 1999), as well as on the Internet at location http://www.wdvl.com/Authoring/HTML/Head/Meta/HTTP.html.

The syntax forms shown in FIGS. 2A and 2B are referred to equivalently hereinafter as "refresh headers". When a browser supporting refresh headers receives a document which has a refresh header, the browser automatically sends a subsequent request for refreshed content after waiting for the specified time (in seconds). The server receiving the subsequent request then returns the content, and that content is used to repaint the screen (in a visual rendering), overlaying the previous content.

Figure 3A:
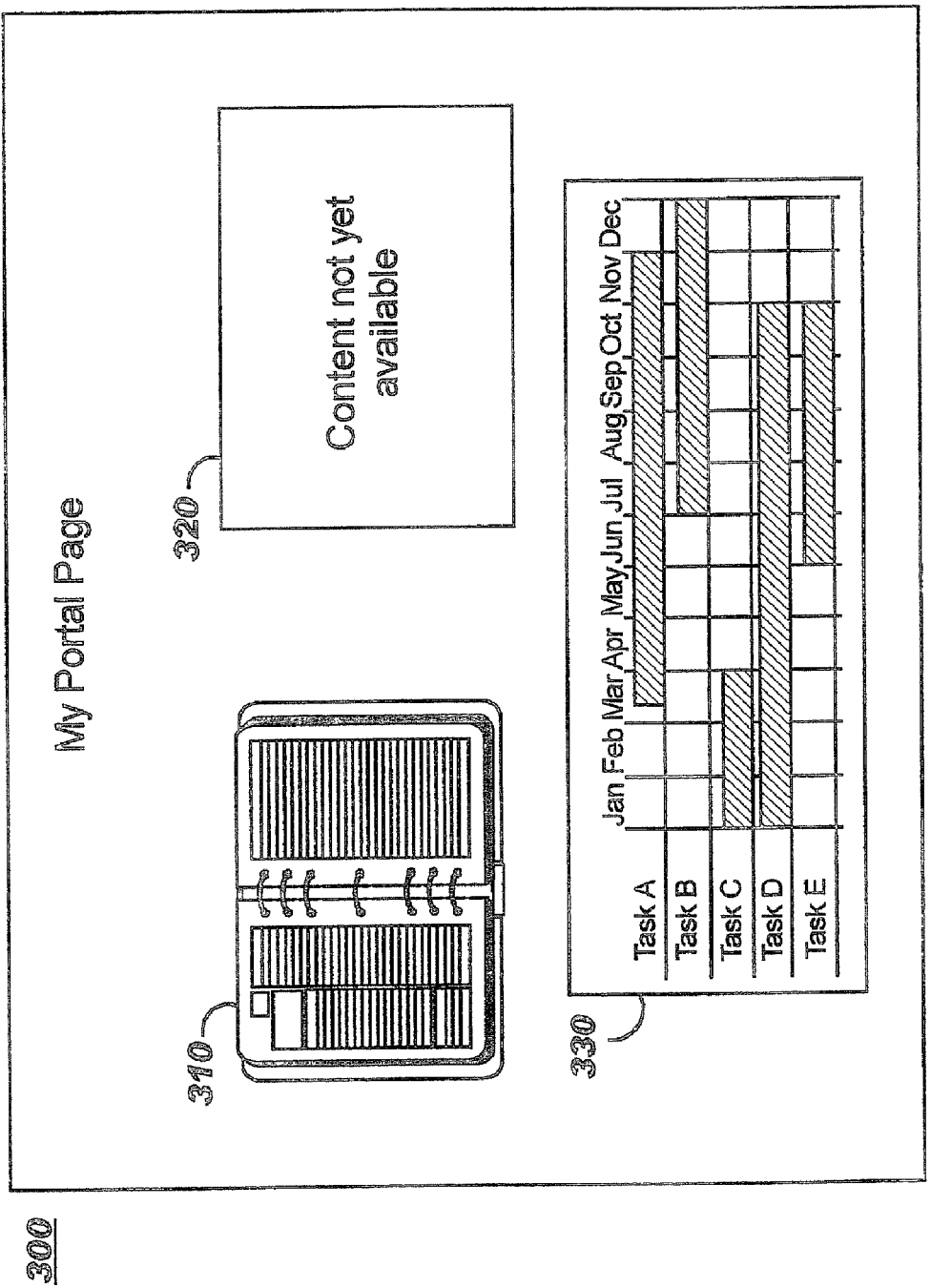
FIG. 3A illustrates a sample portal page in which content from some portlets is rendered, while content from other late-finishing portlets is not, according to the present invention.

Referring now to FIG. 3A, a sample portal page 300 is shown in which content from three portlets is to be rendered (see elements 310, 320, 330). Portlet 310 represents the user's calendar entries, portlet 330 provides a yearly scheduling chart, and portlet 320 is to provide up-to-date analysis of customer call frequency at a Help Desk. Suppose that analyzing the call frequency information takes a relatively long amount of time, and that the calendar and yearly chart have already been generated. Rather than delaying delivery of the entire portal page until all the portlet content is ready, as in the prior art, the partially-complete portal page 300 is delivered to the end user without waiting for portlet content at 320, which in this example represents the late-finishing portlet. If this page 300 is delivered with the refresh header of FIG. 2A or 2B, the user's browser will display this initial portal page, wait for 12 seconds, and then send another request for the same page. Assuming that the late-finishing portlet has acquired its content in the interim, the response to the second request will enable the browser to repaint the portal page with complete information. An example of the resulting refreshed portal page 340 is shown in FIG. 3B, where the customer call frequency analysis is presented as chart 350. This incremental rendering approach gives the end user at least some of the portal page content in a very quick response, providing a much more user-friendly experience.

Note that the placeholder message displayed instead of portlet content at 320 is merely one way in which absence of a portlet's content can be indicated. Alternatives include displaying an image to fill the space; displaying a message reflecting the portlet's purpose (which may be obtained programmatically from the portlet's properties interface, for example); and leaving the space unoccupied. (When the portlet content eventually arrives and is painted in its place on the portal page, the user ideally will perceive that the portlet's area of the portal page is simply being repainted with its content, rather than the entire page being repainted.)

It may happen that the delay value on the refresh header was not set to a sufficiently long value, and the request for portal page content that was triggered by the refresh header arrives at the portal server before all portlets have finished acquiring their content. When this happens, the server preferably sends a revised portal page (the second version of the page, that is) in response to the browser request, and includes another refresh header with this response. The time value on this header may be the same as, or different from, the value on the first refresh header. (The manner in which the time value for the header is determined is described below with reference to FIG. 4.) This process repeats until all content is ready; when the portal has a complete portal page for returning to the browser, the refresh header is omitted.

Turning now to FIG. 2C, an example is provided of syntax that may be used for incremental portal page rendering according to the second embodiment of the present invention. The MIME type of "multipart/x-mixed-replace" is used for the content type header in the HTTP response with which the portal page is delivered to the requester, as shown at 230, to indicate that content appearing within data blocks denoted by successive "boundary" elements is to replace the content rendered from earlier data blocks. The boundary attribute in this example specifies that the string "PortalPageContent" (see 240) is used to delimit the data blocks. When using this embodiment, an initial partially-complete portal page is specified as the first data block, and follows the first occurrence of the boundary delimiter. This portion 250 of the document shown in FIG. 2C is then transmitted to the browser, where it will be rendered. When additional portlet content is acquired, the markup language document specifying the portal page is regenerated to include the newly-acquired content. The boundary string, followed by the regenerated portal page, is then sent to the browser as a replacement document (illustrated by element 260 of FIG. 2C). This replacement document will be rendered, overlaying the previous version of the portal page. Suppose for purposes of the example that the second version of the portal page still did not include content from all the portlets, and that a third version is generated at some later time to include all the portlet content. This replacement content is again preceded by the boundary string, and because it is the final version of the portal page, it is also followed by the boundary string where the boundary string ends with two dashes ("--") to denote that this is the terminating boundary string (see element 270 in FIG. 2C).

In this second embodiment, the portal server is in control of when additional content is pushed to the client. Therefore, the server may choose to wait until all portlets have finished before sending a revised page, such that there are at most two data blocks in the multipart MIME document. Or, the server may send a revised data block each time it detects that a portlet has acquired its content. Other triggering events may also be used to send a revised data block, such as expiration of a timer after which a document including the currently-available content will be sent. (The value of this timer may be determined using the techniques described herein for setting the value on the refresh header. Refer to the discussion of Block 450 of FIG. 4, below, for more information.)

The portal page content delivered in subsequent requests, after receiving content specifying a refresh header according to the first embodiment or after receiving subsequent data blocks in the multipart MIME approach of the second embodiment, will overlay previously-rendered content from earlier versions of the portal page, as has been stated. Therefore, portal pages which are rendered using the approach of the first and second embodiments are preferably designed to limit the user's interaction with the page contents. Interactions may include clicking on links and so forth, but preferably do not allow the user to fill in forms or perform other types of interactions that would result in lost work when the page is overlaid. Or, rather than limiting the user's interactions in this manner, a third embodiment of the present invention may be used wherein portal pages are rendered using frames. This approach associates a separate Uniform Resource Locator ("URL") with each frame of the page, where the frame markups sent to the browser instruct the browser to retrieve a "mini-page" from that URL to fill in the frames in the page. In a first aspect of this third embodiment, each mini-page represents the results of a single portlet. In an optional second aspect of this third embodiment, a mini-page may represent an aggregation of portlets. When using the approach of the first aspect, the browser sends a separate request for the content of each portlet which has its own frame, and the request is automatically held at the server until the portlet's content is ready. At that time, the content is formatted and returned on a response message, and the receiving browser renders it in place within the already-rendered portal page. Thus, the rendered portal page is not overlaid when using this technique, except for the portlet's own frame.

There is a practical limit to the number of outstanding browser requests which a browser implementation can manage. If a portal page has a large number of portlets, this limit can be avoided using the technique of the second aspect, whereby a frame holds several portlets. In this case, when the browser sends a request for a URL representing more than one portlet, the server returns the content for as many portlets as are ready when the request is received. It then uses the refresh header technique of the first embodiment or the multipart MIME technique of the second embodiment to subsequently deliver a new version of the frame which includes the content from late-finishing portlets.

In a fourth embodiment of the present invention, if the content of all portlets is not ready when the immediate response is being formatted for delivery to the requesting browser, a hyperlink is programmatically inserted into the initial version of the markup language document which represents the portal page. Preferably, a descriptive message is also inserted, instructing the user that clicking on this hyperlink will request a revised version of the portal page (or when frames are used for the page, a revised version of the frame with which the hyperlink is associated). The URL for the hyperlink is then the same URL used to originally request the content of the portal page (or of the frame, respectively). Conversely, if a content request is received and all the content is ready (whether on the initial request or a subsequent request), the hyperlink is omitted.

Figure 4:
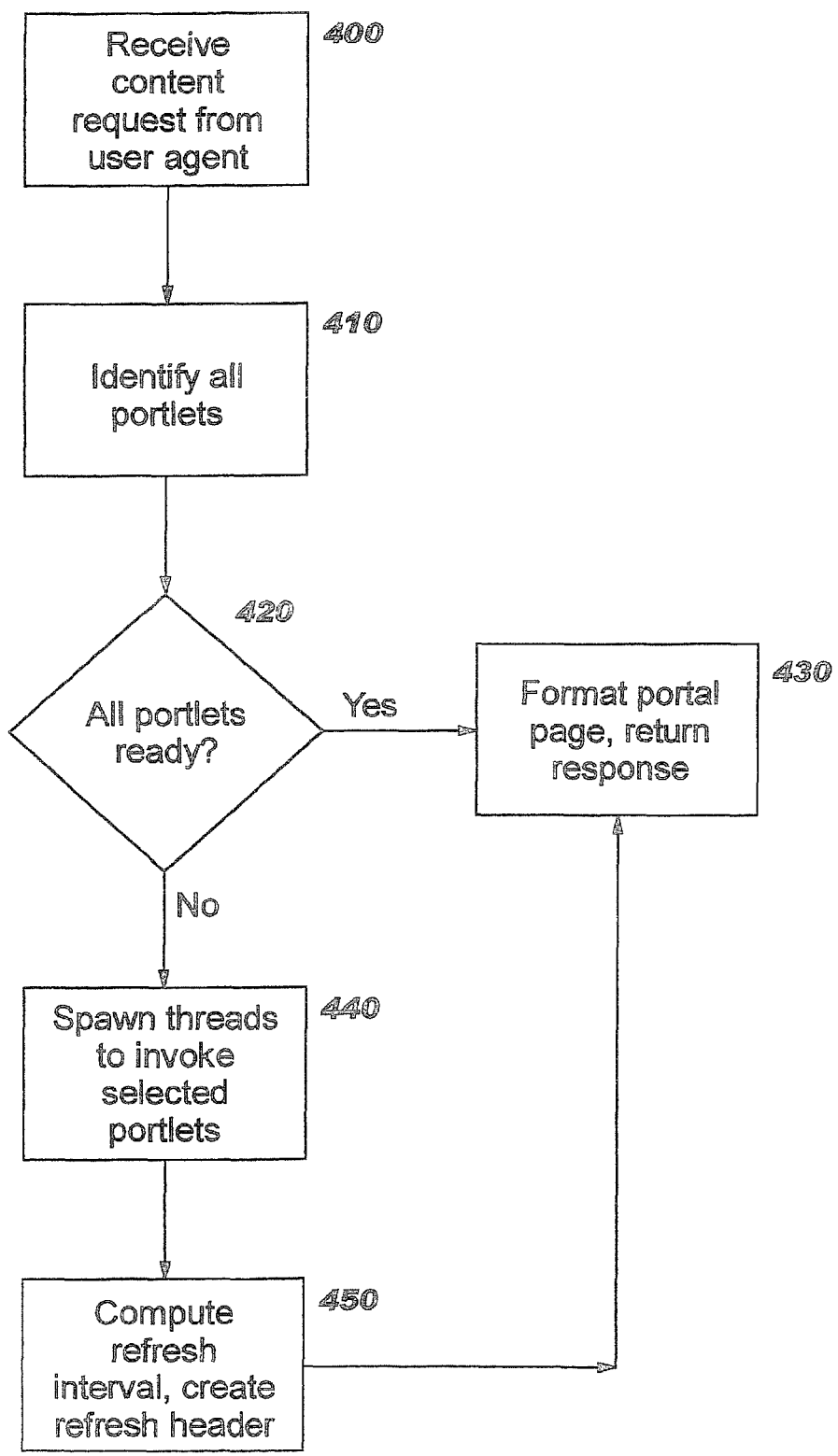
FIGS. 4-6 provide flowcharts illustrating operation of preferred embodiments of the present invention.

Referring now to the flowcharts in FIGS. 4-6, logic depicting operations of preferred embodiments of the present invention will now be described. FIG. 4 illustrates logic operating on a portal server when using the client pull approach of the first embodiment. At Block 400, a content request for a portal page is received from a user agent. The portlets comprising that portal page are then determined (Block 410). When users are allowed to personalize their portal pages to include different content, then the portal identification in Block 410 may comprise obtaining information identifying this particular user from the content request, and using that information to access a user preferences repository to locate this user's previously-stored preferences, including the set of portlets to be rendered for this user.

In Block 420, a test is made to determine if all portlets have their content available. If so, then processing continues at Block 430, described below. Otherwise, an identification is made of those portlets which have content available and those which need to fetch content. In preferred embodiments, portlet instances can be in one of three states: not ready, loading, or ready. Threads are spawned only for portlets in the "not ready" state (which is the initial state). When a thread is spawned, the portlet transitions from "not ready" to "loading". When a portlet has its content, it transitions from "loading" to "ready". Thus, at Block 440, separate threads are spawned for each portlet which requires remote content and which is in the "not ready" state, to maximize the concurrency of portlet operations in order to reduce the cumulative processing time and the corresponding delay in presenting a complete portal page to the user. (Some portlets may have locally-cached content, which may be indicated, for example, in the portlet deployment descriptors. In those cases, the content is preferably retrieved from cache without spawning a separate thread.)

Block 450 computes the refresh interval to be used for this response. In preferred embodiments, prior art techniques are preferably leveraged to develop heuristics for empirically determining how long it takes a portlet to fetch its content. (This is analogous to algorithms used by transmission protocols to determine round trip times.) In the preferred approach, timing measurements are taken for how long it takes a particular portlet to fetch its content. This value is referred to as the measured fetch time or "FT". The measured fetch time for a particular (n-th) invocation of a portlet is denoted as FT(n). An algorithm computes the predicted fetch time, "PT(i)", for the current (i-th) fetch operation. In preferred embodiments, this algorithm uses the previously-recorded measured fetch time for the fetch operation (i−1) and the fetch time that was predicted for that fetch operation. A weighting value is preferably applied to dynamically adjust the predicted fetch time for this i-th invocation of the portlet to take into account changing factors such as network congestion and server loads. Using a weighting value "a", where a is some number between 0 and 1, the algorithm used in preferred embodiments is:

$$PT(i)=a*FT(i-1)+(1-a)*PT(i-1)$$

A timer is preferably started each time a thread is spawned for a portlet. (When the thread completes and returns the portlet's content to the spawning process, referred to herein as the "portlet invoker", the finish time will be noted and compared to the start time to determine the current measured fetch time. The newly-computed measured fetch time will be stored, along with the predicted fetch time, to enable use of the algorithm shown above.)

The processing in Block 450 comprises obtaining the predicted fetch time for each portlet for which a thread was spawned in Block 440, and in preferred embodiments, adding a configurable constant value "C" to the largest predicted fetch time, thereby yielding the refresh interval. Alternative approaches may be used without deviating from the scope of the present invention, including but not limited to: adding a fixed (i.e. non-configurable) time to the largest predicted fetch time; using a median fetch time instead of the largest fetch time; and so forth. The computed refresh interval is used to create the refresh header. (Refer to the discussion of FIGS. 2A and 2B, above, for more information about the refresh header.)

At Block 430, the portal page is formatted (e.g. as a markup language document), using the content from each portlet that has content currently available (i.e. those portlets in the "ready" state). Preferably, placeholders are inserted for those portlets which are still acquiring their content, as illustrated in FIG. 3A. The formatted document, along with the refresh header when Block 450 was executed, are used to create an HTTP response, which is then returned to the requester.

Note that while references herein are in terms of using HTTP for transmitting request and response messages, this is merely for purposes of illustration. The present invention may be used with other protocols which provide features analogous to those described herein, without deviating from the scope of the present invention. Furthermore, while the present invention is discussed in terms of documents encoded in HTML, this is for purposes of illustration and not of limitation. Other markup languages may be used alternatively, including, but not limited to: Wireless Markup Language ("WML"); i-mode format; and Handheld Device Markup Language ("HDML").

If a subsequent request for this portal page is received in response to the browser's processing of the refresh header, the logic of FIG. 4 is re-executed. If the refresh header was set to a sufficiently large value for the portlets to complete, then the test in Block 420 will have a positive result, and the complete portal page will be formatted and returned in Block 430;

otherwise, a new refresh interval will be computed, and another partially-complete portal page will be sent (in Blocks 450 and 430, respectively). (Note that the processing of Block 440 will be bypassed for those portlets which are in the "loading" state due to an earlier invocation of this logic.)

Figure 5:
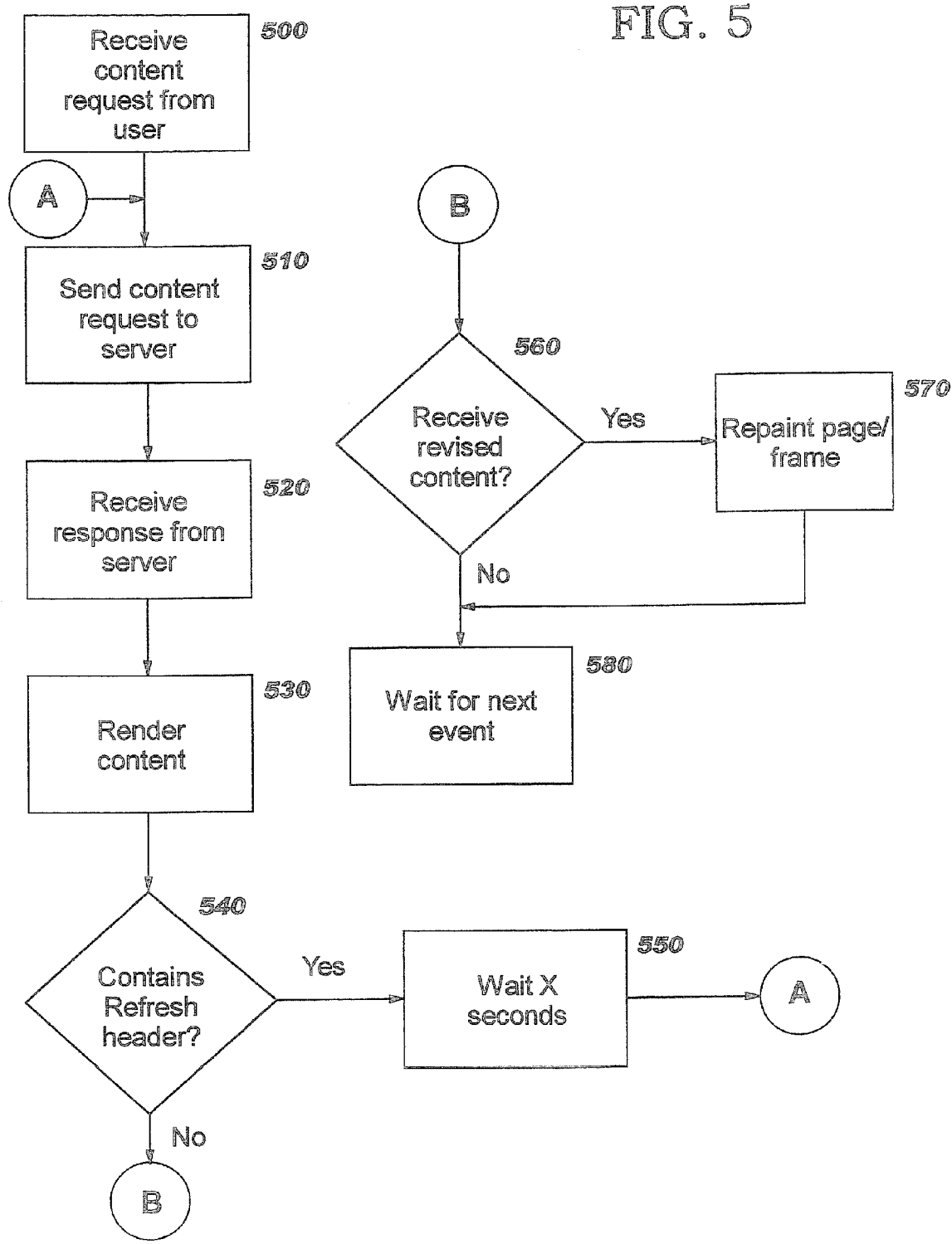

The flowchart in FIG. 5 illustrates processing occurring on the client. At Block 500, the browser receives a request from the end user to render a portal page. This request may be explicitly entered by the user, or the user might be using this portal page as his or her home page, in which case the request is automatically generated for the user. A request for this portal page (or for individual frames of the portal page, when using a frame-based portal page) is then sent to the portal server (Block 510). After the server's response is received (Block 520), the client renders the returned content (Block 530).

Block 540 checks to see if the response message contained a refresh header. If so, then Block 550 implements a wait for the amount of time specified as a parameter of that header, after which control returns to Block 510 to send another request for the same page/frame. If not, then Block 560 checks to see if revised content has been received from the server using the multipart MIME technique. If so, then the page/frame is repainted (Block 570). In either case, the processing of the current response message is complete (for purposes of the present discussion), and at Block 580, the client waits for the next event.

It will be obvious to one of ordinary skill in the art that the processing depicted in FIG. 5 is simplified for purposes of illustrating the present invention. This processing uses capabilities of prior art browsers, as discussed earlier, thereby facilitating use of the present invention.

Figure 6A:
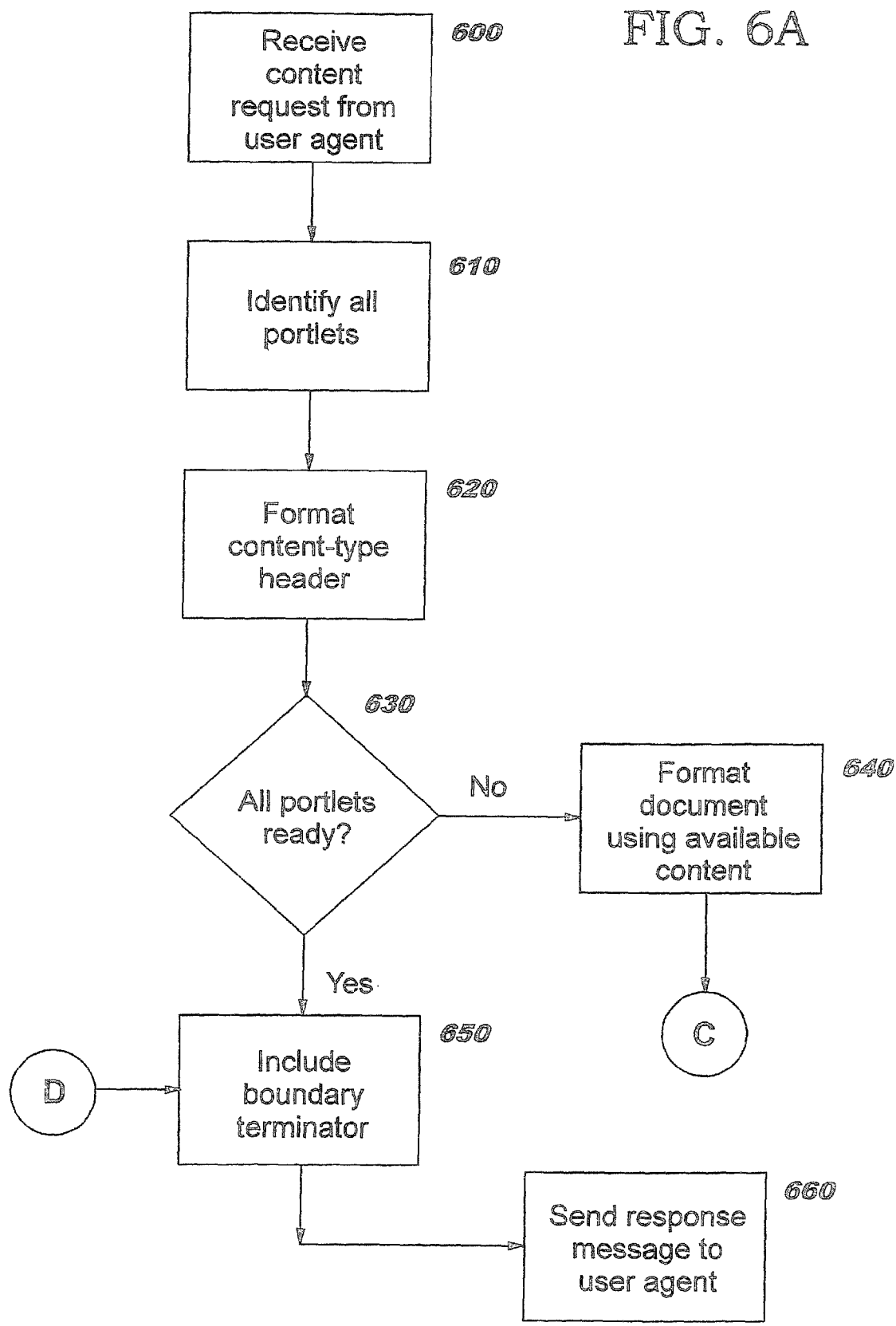

FIG. 6 depicts logic operating on a portal server when using the multipart MIME type of the second preferred embodiment. A content request for a portal page (alternatively, for a frame within a portal page, when using frames) is received from a user agent (Block 600). The portlets comprising that portal page/frame are then determined (Block 610), as discussed with reference to Block 410 of FIG. 4. The multipart MIME type header is formatted (Block 620). Block 630 then tests to see if all portlets have their content available (i.e. are in the "ready" state). If so, then a terminating boundary string is to be included in this outbound message, as noted by Block 650. Block 660 sends a response message to the user agent which includes the content currently available (which in this case is the complete portal page/frame), followed by the terminating boundary string. The processing of this request is then complete.

When Block 630 has a negative result, Block 640 formats a response which includes the currently-available content for this portal page/frame, preceded by a boundary string. This response is sent to the requester (Block 670), and separate threads are spawned (Block 680) for each portlet which requires remote content and which is in the "not ready" state. Upon detecting completion of one of these threads, Block 690 checks to see if all portlets are now finished and in the "ready" state. If not, the process of sending another data block which contains the currently-available content preceded by a boundary string is repeated in Blocks 700 and 710, after which the portlet invoker waits for another thread to finish. If all threads have finished, however, then control transfers to Block 650 where a terminating boundary string is included, and the complete version of the portal page/frame is sent to the requester in Block 660.

As has been demonstrated, the present invention provides advantageous techniques for rendering portal pages for users. By delivering a partially-complete page as an immediate response to the page request, and providing programmatically-generated mechanisms for supplying additional content incrementally, the user's experience is improved as contrasted to prior art approaches where the user was forced to wait until all portlet content was ready before seeing anything. When using the present invention, late-finishing portlets can no longer cause the portal page to be delayed in this manner.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

That which is claimed:

1. A system for incrementally rendering content in a content framework, comprising:
   a processor; and
   memory connected to the processor, wherein the memory is encoded with instructions and wherein the instructions when executed comprise:

instructions for receiving a request for a portal page, wherein a plurality of portlets provide content for the portal page;

instructions for immediately returning a response message containing a first document and a refresh trigger responsive to receiving the request, wherein the first document represents results from any of said plurality of portlets which have acquired their content but does not represent results of all of said plurality of portlets;

instructions for programmatically generating a mechanism for delivering an updated document responsive to immediately returning the response message containing the first document and the refresh trigger, wherein the updated document further represents results from at least one of said plurality of portlets which had not acquired their content when the first document was returned;

instructions for receiving a subsequent request for the portal page, the subsequent request having been automatically sent responsive to receiving the refresh trigger; and instructions for returning a subsequent response comprising the updated document responsive to receiving the subsequent request, the updated document being a subsequent version of the first document and representing results from any of said plurality of portlets which have acquired their content thus far and which omits the refresh trigger only if all of said plurality of portlets have now acquired their content.

2. The system according to claim 1, further comprising:
instructions for receiving the response message by a client from which the request for the portal page was sent;
instructions for rendering, by the client, the first document from the received response message; and
instructions for automatically sending a subsequent request for the portal page after waiting for a time specified by a value of the refresh trigger.

3. The system according to claim 1, wherein the instructions for programmatically generating a mechanism comprises instructions for creating a multipart document, and wherein the first document is embedded in a first of the parts of the multipart document.

4. The system according to claim 3, wherein the first of the parts is preceded by a boundary string used to delimit parts of the multipart document, and is followed by a terminating boundary string only if the first document represents results from all of said plurality of portlets.

5. The system according to claim 3, further comprising:
instructions for receiving the response message by a client from which the request for the portal page was sent;
instructions for rendering, by the client, the first document from the first of the parts of the multipart document;
instructions for receiving, by the client, subsequent parts of the multipart document, each of the subsequent parts comprising a revised version of the first document; and
instructions for rendering, by the client, the subsequent parts of the multipart document.

6. The system according to claim 3, further comprising:
instructions for detecting that at least one of said plurality of portlets which had not acquired their content when the first document was returned in the response message have now acquired their content; and
instructions for sending, responsive to the means for detecting, a subsequent response message containing a revised version of the first document, the revised version representing results from the at least one of said plurality of portlets and being embedded in a subsequent part of the multipart document.

7. The system according to claim 6, wherein the subsequent part is preceded by a boundary string used to delimit parts of the multipart document and is followed by a terminating boundary string if the revised version represents results from all of said plurality of portlets.

8. The system according to claim 1, wherein the instructions for programmatically generating a mechanism comprises instructions for programmatically inserting a hyperlink into the first document, wherein the inserted hyperlink can be used to explicitly request delivery of the updated document.

9. A system for incrementally rendering content in a content framework, comprising:
a processor; and
memory connected to the processor, wherein the memory is encoded with instructions and wherein the instructions when executed comprise:
instructions for receiving a request for a portal page frame, wherein a plurality of portlets provide content for the portal page frame;
instructions for immediately returning a response message containing a first mini-document and a refresh header responsive to receiving the request, wherein the first mini-document represents results from said plurality of portlets which have acquired their content but does not represent results of all of said plurality of portlets; and
instructions for programmatically generating a mechanism for delivering an updated mini-document responsive to immediately returning the response message containing the first mini-document and the refresh header, wherein the updated mini-document further represents results from at least one of said plurality of portlets which had not acquired their content when the first mini-document was returned;
instructions for receiving a subsequent request for the portal page frame, the subsequent request having been automatically sent responsive to receiving the refresh header; and
instructions for returning a subsequent response comprising the updated mini-document responsive to receiving the subsequent request, the updated mini-document being a subsequent version of the first mini-document and representing results from said plurality of portlets which have acquired their content thus far and which omit the refresh header only if all of said plurality of portlets have now acquired their content.

10. The system according to claim 9, wherein the instructions for programmatically generating a mechanism comprises instructions for including a syntax element in the response header, wherein the syntax element is encoded using a markup language.

11. The system according to claim 9, wherein the instructions for programmatically generating a mechanism comprises instructions for creating a multipart document, and wherein the first mini-document is embedded in a first of the parts of the multipart document.

12. A computer program product for incrementally rendering content in a content framework, the computer program product comprising a computer usable storage medium having computer readable program code embodied therewith, the computer readable program code comprising:
computer readable program code configured to receive a request for a portal page, wherein a plurality of portlets provide content for the portal page;

computer readable program code configured to immediately return a response message containing a first document and a refresh trigger responsive to receiving the request, wherein the first document represents results from said plurality of portlets which have acquired their content but does not represent results of all of said plurality of portlets;

computer readable program code configured to programmatically generate a mechanism for delivering an updated document responsive to immediate return of the response message containing the first document and the refresh trigger, wherein the updated document further represents results from at least one of said plurality of portlets which had not acquired their content when the first document was returned;

computer readable program code configured to receive a subsequent request for the portal page, the subsequent request having been automatically sent responsive to receiving the refresh trigger; and computer readable program code configured to return a subsequent response comprising the updated document responsive to receiving the subsequent request, the updated document being a subsequent version of the first document and representing results from said plurality of portlets which have acquired their content thus far and which omits the refresh trigger only if all of said plurality of portlets have now acquired their content.

13. The computer program product according to claim 12, further comprising:
   computer readable program code configured to receive the response message by a client from which the request for the portal page was sent;
   computer readable program code configured to render, by the client, the first document from the received response message; and
   computer readable program code configured to automatically send a subsequent request for the portal page after waiting for a time specified by a value of the refresh trigger.

14. The computer program product according to claim 12, wherein:
   the programmatically generated mechanism comprises creating a multipart document;
   the first document is embedded in a first of the parts of the multipart document;
   the first of the parts is preceded by a boundary string used to delimit parts of the multipart document; and
   the first of the parts is followed by a terminating boundary string only if the first document represents results from all of said plurality of portlets.

15. The computer program product according to claim 14, further comprising:
   computer readable program code configured to receive the response message by a client from which the request for the portal page was sent;
   computer readable program code configured to render, by the client, the first document from the first of the parts of the multipart document;
   computer readable program code configured to receive, by the client, subsequent parts of the multipart document, each of the subsequent parts comprising a revised version of the first document; and
   computer readable program code configured to render, by the client, the subsequent parts of the multipart document.

16. The computer program product according to claim 14, further comprising:
   computer readable program code configured to detect that at least one of said plurality of portlets which had not acquired their content when the first document was returned in the response message have now acquired their content; and
   computer readable program code configured to send, responsive to the computer readable program code configured to detect, a subsequent response message containing a revised version of the first document, the revised version representing results from the at least one of said plurality of portlets and being embedded in a subsequent part of the multipart document.

17. The computer program product according to claim 16, wherein the subsequent part is preceded by a boundary string used to delimit parts of the multipart document and is followed by a terminating boundary string only if the revised version represents results from all of said plurality of portlets.

* * * * *